United States Patent [19]

Hara

[11] Patent Number: 4,776,710

[45] Date of Patent: Oct. 11, 1988

[54] LOW FRICTION ROLLER MEMBER

[75] Inventor: Takehiko Hara, Yokohama-shi, Japan

[73] Assignee: Nippon Thompson Co., Ltd., Tokyo, Japan

[21] Appl. No.: 82,505

[22] Filed: Aug. 7, 1987

[30] Foreign Application Priority Data

Mar. 11, 1987 [JP] Japan .................................. 62-56059

[51] Int. Cl.$^4$ ............................................. F16C 33/34
[52] U.S. Cl. ...................................... 384/565; 384/619
[58] Field of Search .................. 384/50, 56, 19, 43–45, 384/447, 462, 548, 565–568, 618, 619, 625, 571, 445; 29/148.4 R, 148.4 A, 148.4 D; 312/341 R

[56] References Cited

U.S. PATENT DOCUMENTS

| | | | |
|---|---|---|---|
| 1,041,900 | 10/1912 | Tatum | 384/567 |
| 1,180,586 | 4/1916 | Huther | 384/569 |
| 1,185,450 | 5/1916 | Ternström | 384/565 |
| 2,734,787 | 2/1956 | Dorl | 384/571 |
| 3,128,134 | 4/1964 | Dorl | 384/455 X |
| 3,682,519 | 8/1972 | Shepelyakovsky et al. | 384/625 |

FOREIGN PATENT DOCUMENTS

| | | | |
|---|---|---|---|
| 1178182 | 9/1964 | Fed. Rep. of Germany | 312/341 R |
| 2018132 | 11/1970 | Fed. Rep. of Germany | 312/341 N |
| 0552441 | 3/1977 | U.S.S.R. | 384/565 |
| 0811006 | 3/1981 | U.S.S.R. | 384/571 |

*Primary Examiner*—Stuart S. Levy
*Assistant Examiner*—Thomas R. Hannon
*Attorney, Agent, or Firm*—Rogers & Killeen

[57] ABSTRACT

The low friction roller provided by the present invention is featured by the construction, wherein an end plate made of organic or inorganic low friction material is fitted onto each of the opposing end faces of a cylindrical roller body with the use of chemical or mechanical bonding method, thus in operation, the low friction roller member moves along and through a raceway track provided in a roller bearing with minimum friction being generated with not only the track surface but also the contacting surface of roller retainer members provided therefor, so that low friction and smooth circulation of a plurality of roller members in the bearing can be ensured for a prolonged period of time.

14 Claims, 4 Drawing Sheets

FIG. 4A
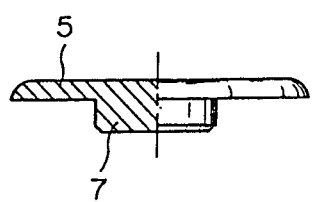
FIG. 5A
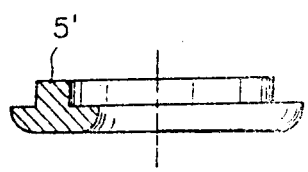
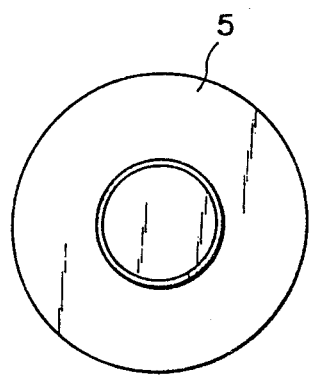
FIG. 4B
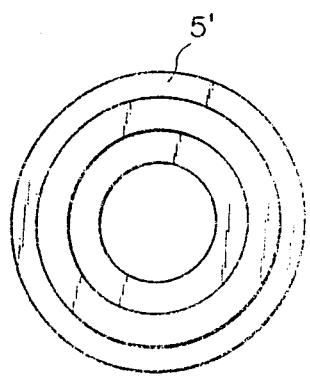
FIG. 5B

LOW FRICTION ROLLER MEMBER

BACKGROUND OF THE INVENTION

1. Field of use in the industry

The roller member according to the present invention is constructed for use in various kinds of bearings such as a cross roller-type bearing, a rectilinear circulating-type roller bearing, a needle-type roller bearing, and the like, which is featured in that a low friction end plate in the form of either a foil or a layer is fixed onto each of the opposite end faces of a roller body, and this leads to a great reduction of wear and abrasion of the roller, in operation, and accordingly to prolongation of durability thereof, thus enhancing a great usefulness of the bearing in the industry.

2. Description of the Prior Art

The roller used in a conventional roller bearing is inherently accompanied by such a technical problem that the contact face of the roller is worn out with a prolonged use, because it is kept in motion under continuous rolling- and sliding-contacts with the raceway track and the retainer means of the bearing.

PROBLEMS TO BE SOLVED BY THE PRESENT INVENTION

It is a tendency in recent years that a cross roller-type bearings built in industrial robotic machines or rectilinear circulating-type roller bearings built in sliding parts of accurate measuring instruments are used under comparatively small bearing-loads, in which the load capacities of the bearings are of little importance but rather important are rotation characteristics that form an essential requirement for bearings to be able to operate with a low friction torque.

In response to this requirement, attempts were made in the art to improve the rolling face of bearings, namely, the accuracy of dimensions thereof and roughness of the raceway track face. Indeed these attempts attained some effects in their own way, but regarding the reduction of rolling friction had a certain limitation. Regarding the sliding friction of each of the opposite end faces of a roller, only little attention was paid in these attempts. And the present inventor has paid attention to this point to improve the above defect of conventional bearings.

MEANS TO SOLVE THE PROBLEM

The present invention is provided to solve the above-mentioned problem by fixing a low friction member, in the form of foil or layer made of a material different from that of the roller body, onto each of the opposite end faces thereof thereby to reduce sliding friction of the roller member.

More specifically, the present invention is featured by a roller member for use in a cross roller-type bearing, a rectilinear circulating-type roller bearing, a needle-type roller bearing, and the like, said roller member comprising a roller body with a low friction end plate being fitted in the form of either a foil or layer onto each of the opposite end faces of the roller body with the use of chemical or mechanical bonding method, so that the roller member may move under rotation along and through the raceway track of the bearing with the low friction end plates being kept in contact therewith.

ACTIONS OF THE INVENTION

Due to the specific construction mentioned above, the roller member of the present invention to be used in bearing can effectively reduce not only a sliding friction generated between end face of the roller and raceway track member of bearing, and further but also a friction torque of the bearing so as to provide industrially effective bearings which could not been realized in the conventional art.

CONSTRUCTION OF THE INVENTION

The roller member of the present invention is of a cylindrical form, made of steel or alloy having excellent wear and abrasion resistance, wherein the cylindrical roller member may be solid or hollow in structure.

For the formation of the low-friction end plate to be fixed onto each of the opposite end faces accoridng to the present invention can be employed any known low-friction plastic material comprising fluorine resin containing a special filler with the use of PTFE (polytetrafluoroethylene), a self-lubricating material, a polyacetal resin, or nylon etc. If desired, abrasion resistant inorganic material such as a super hard alloy, ceramics and like may also be employed optionally. And the end plate may be of any proper form, such as, a form entirely or partially conforming to or similar to the form of the end face of the cylindrical roller body, or a form of a doughnut, and the diameter thereof may properly be selected. The thickness of the end body can optionally be selected according to the purpose for use and characteristics of the bearing. Fixing of a low-friction end face plate onto each end face of a cylindrical roller body can be effected by any known methods, either mechanical or chemical. And the method can be properly selected according to the conditions in which the bearing is used, such as for example from the methods including heat-press fixing, caulking, and dispersion process, etc.

The present invention will be explained further in detail hereinbelow with reference to the accompanying drawings.

EXPLANATION OF DRAWINGS

The invention will be described hereinbelow in greater detail with respect to various embodiments thereof by referring to examples shown in the accompanying drawings, in which:

FIG. 4a–b shows a plan view and a sectional view, respectively, of the end plate of the present roller member shown in FIG. 2, FIG. 5a–b is a view similar to that of FIG. 4, but showing the end plate of the present roller member shown in FIG. 3.

1 . . . a cylindrical roller, 1b . . . an end face of the roller, 2 . . . an annular outer shell, 2b . . . a flange, 3 . . . an annular inner shell, 4 . . . a retainer, 5, 5', 5", 5''' . . . end plates, 6, 6', 6" . . . recesses, 7,7',7" . . . projections, 8 . . . a throughbore of the cylindrical roller, 9 . . . a pin member, 9' . . . a discoid end plate, 9" . . . a cylindrical portion.

EMBODIMENT 1

Figure 1:
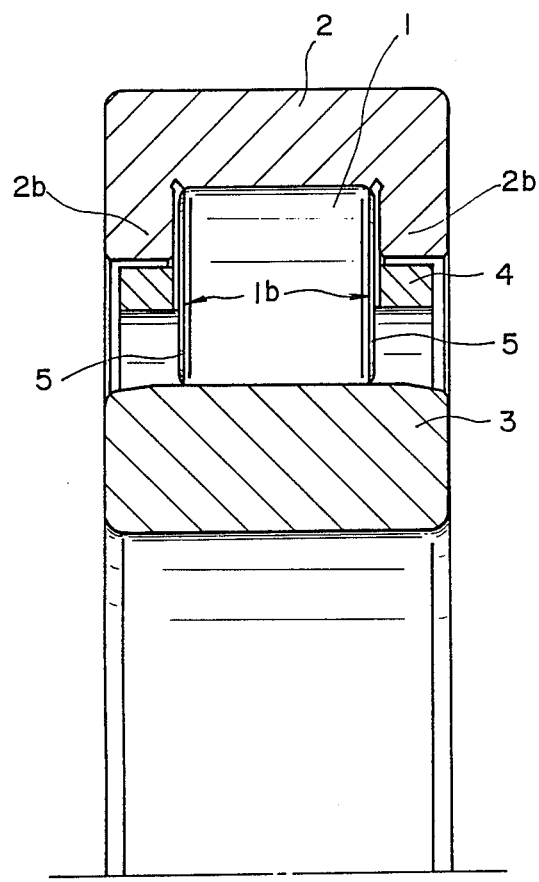
FIG. 1 is a vertical section of a low-friction roller member of the present invention that is shown as being interposed between an annular outer shell and an annular inner shell mounted within said annular outer shell, which together constitute a UN-type roller bearing.

FIG. 1 is a vertical section of a cylindrical NU-type roller bearing wherein roller member 1 according to the present invention is mounted; the bearing is of a hollow cylindrical shape, preferably with a diameter to height ratio of about 1:1, and is composed of an annular outer shell 2 having, at the opposing peripheral edges, depending flanges 2b extending inwardly by a limited distance in parallel with each other toward the longitudinal axis of the bearing, and an annular inner shell 3 of a substantially hollow cylindrical shape to be mounted in the central cavity of said annular outer shell, a raceway track formed by an outer raceway provided on the internal periphery of said annular outer shell and an inner raceway provided on the external periphery of the annular inner shell, for receiving a number of cylindrical roller members 1 between said outer and inner raceways in a freely traveling fashion with retainer members 4 provided on both the lateral sides of said raceways.

In the operation of the bearing, therefore, each of the cylindrical roller member 1 rolls along and through the raceway track formed of an outer annular raceway and an inner annular raceway with its rolling face in contact with said two annular raceways and, on the other hand, each of the opposite end faces 1b of the cylindrical roller member is kept in sliding contact with the depending flanges 2b formed on opposited peripheral edges of the annular outer shell as well as with windows of the retainer members 4 provided on both lateral sides of the raceway track.

An end plate 5 in the form of either a low friction foil or layer is fixed on to each of the opposite end faces of the cylindrical roller members thereby to reduce the contact friction taking place with the inner faces of the depending flanges 2b of the annular outer shell, as well as with the retainer members 4 when the rollers are traveling along and through the raceway track. The thickness of the low friction end plate 5 may be determined as desired but is thin relative to the axial length of the members 1, preferably with an extension beyond the end of the members 1 of less than about ten percent.

Besides the bearing illustrated in FIG. 1, the cylindrical roller member of the present invention may be suitably used also for cross roller-type bearings, rectilinear circulating-type roller bearings, needle-type roller bearings and the like.

Figure 2:
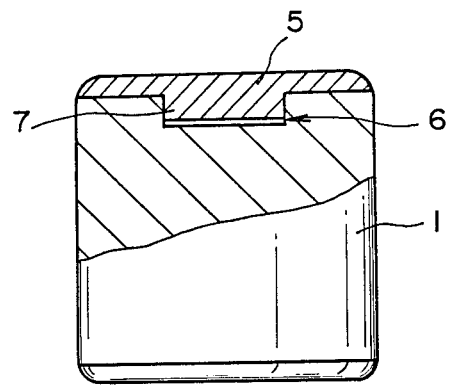
FIG. 2 is a vertical section of the first embodiment of the present low friction roller member that is illustrated in FIG. 1.

FIG. 2 illustrates an example of a low friction cylindrical roller member of the present invention, where a low friction end plate is fixed on to one end face of a roller body; in the embodiment, a recess 6 is formed at the axially central portion of each of the roller end faces, and a projection 7 having a configuration in conformity with that of the recess is formed at the central portion of the rear face of a thin discoid end-plate (see FIG. 4), and then the projection 7 is press-fitted into each of the recesses 6, for example, to form a low friction roller member. In the present embodiment, the outer diameter of the thin discoid low-friction end plate 5 was made slightly smaller than the diameter of the cylindrical roller body, so that the end plate 5 may not touch the raceway track faces provided by the annular inner-, and outer-shells.

Figure 3:
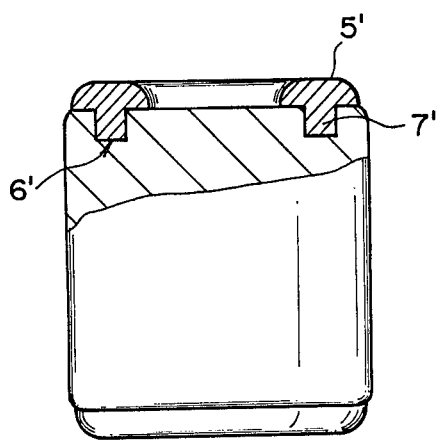
FIG. 3 is a vertical section of the second embodiment of the present low friction roller member.

FIG. 3 and FIG. 5 show the second embodiment of the present invention, illustrating a vertical sectional view and an elevational view, respectively, of a cylindrical roller member, where a low friction end plate 5' fitted to each of the end faces of the cylindrical roller body is of a hollow doughnut shape, and the central opening thereof may act as an oil pocket to enhance lubricating effects of the traveling rollers with the raceway track but the abrasion resistance of this embodiment is naturally inferior to the end plate of the first embodiment illustrated in FIG. 1, due to its particular shape.

Figure 6A:
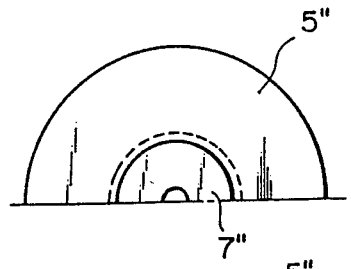
FIG. 6a–b is a vertical section and half of a plan view, respectively, of the third embodiment of the present invention.
Figure 6B:
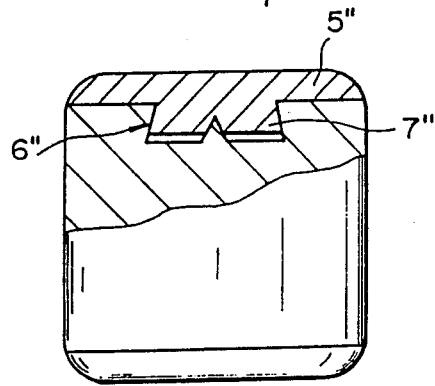

FIG. 6 illustrates the third embodiment of the low friction roller member of the present invention, in which to increase the adhesiveness between the roller member and the low friction end plates a tapered recess 6" is formed at the central portion of each of the opposite end faces of the roller body and, on the other hand, on the inside face of the low friction end plate 5" is formed a projection 7" having a generally wedge-shaped configuration conforming to that of the tapered recess 6", thus the projection 7" may be press-fitted under snap engagement into the tapered recess 6" to effect a rigid mechanical connection therebetween.

The form of the recess to be provided on the roller body may optionally be selected, so long as it may enhance the mechanical connection between the end face plate and the roller body.

Figure 7:
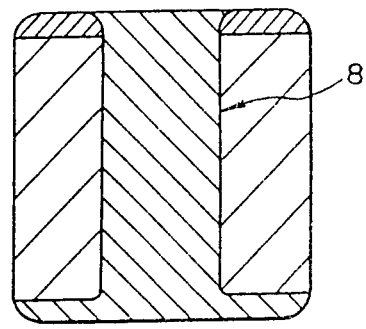
FIG. 7 is a vertical section of the fourth embodiment of the present invention.
Figure 8:
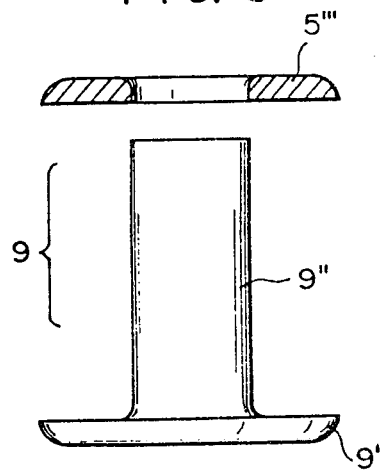
FIG. 8 is a vertical section of the end plate shown in FIG. 7, in the disassembled state.

FIG. 7 shows the fourth embodiment of the present invention, in which is illustrated an example of a modified roller member having a hollow construction that is different from any of the roller bodies shown in FIGS. 1-3, each having a solid construction. From one end of the throughbore or hollow space 8 of the roller body is inserted a cylindrical portion 9" at its free end of a pin member 9 having a discoid end plate 9' integrally formed at the other end with the cylindrical portion 9''', as is illustrated in FIG. 8; an annular end face plate 5''' is securely fitted onto the free end of the cylindrical portion 9" projectinig through the other end of the throughbore or hollow space 8 of the roller body, then the end face plate 5''' and the free end of the cylindrical portion 9" thus fitted thereto are bonded together securely by caulking for example. Besides caulking, any other known mechanical bonding-methods may also be applicable.

The low friction roller member of the present invention has been described above according to the typical embodiments but it should be appreciated that any other end-plate shape and any other fixing mode of the end plate onto the roller body may be applicable without any technical difficulties to the roller member of the present invention.

EFFECTS OF THE INVENTION

Effects of the present invention can be summarized below:

1. The cylindrical roller member according to the present invention can be readily disassembled due to its unique construction into a plurality of parts, including a bearing body, roller means, namely, rolling members, and end plate means, namely, low friction sliding members, therefore it is possible for the manufacturers to make proper selection of materials, shapes, and structures of rolling members and sliding member of the bearing, and further to select the combination thereof properly in compliance with the particular use and purpose the bearings are aimed at so as to achieve the particular features and characteristics. Moreover the manufacturers can suitably adjust the production costs as desired within a certain range in compliance with the users' requests.

2. Since the end plate can be formed of a low friction material, roller members for use in low-friction-torque bearings can be constructed readily and at a low cost to provide bearings having a long operation life and durability.

3. The method of fixing end plates onto a roller body can be effected simply, precisely and efficiently, so that it has become possible to manufacture bearings on a mass-production basis yet with a high production accuracy and at a minimum production cost.

We claim:

1. A roller member for use in a cross roller-type bearing and a rectilinear circulating-type roller bearing, said roller member comprising a solid roller body having a diameter/height ratio of about 1:1 with a low friction end plate being fitted in the form of a foil onto each of the opposite end faces of said roller body with the use of chemical or mechanical bonding method thereby covering the whole surface area thereof, so that said roller member may move under rotation along and through the raceway track of the bearing with the low friction end plates being kept in contact therewith.

2. The roller member as claimed in claim 1, wherein said low friction end plate is made of low friction organic resinous material.

3. The roller member as claimed in claim 1, wherein said low friction end plate is made of inorganic material such as super hard alloy, ceramics and the like.

4. In a roller member for a roller bearing comprising:
a cylindrical roller member adapted to roll along a roller path defined by sides, the cylindrical surface of said member being load bearing and having end caps adapted toslidably engage the sides of the roller path to thereby confine said roller member to the roller path, the improvement
wherein said caps are discoid and are press fit to said roller member;
wherein the extension of said end caps axially of said roller member beyond the ends thereof is small relative to the axial length of said roller member; and
wherein the diameter of said end caps is less than the diameter of said roller member to avoid contact with the roller path when said roller member rolls therealong.

5. The roller member as claimed in claim 4, wherein said low friction end plate is made of inorganic material such as super hard alloy, ceramics and the like.

6. The roller member for a roller bearing as claimed in claim 4, wherein said end caps essentially cover the ends of said roller member.

7. The roller member for a roller bearing as claimed in claim 4, wherein said end caps have the shape of a ring to thereby define a recess suitable for a lubricant.

8. The roller member for a roller bearing as claimed in claim 4, wherein said end caps are made of low friction organic resinous material.

9. The roller member for a roller bearing as claimed in claim 4, wherein said low friction end caps are made of inorganic material from the group consisting of a superhard alloy and a ceramic.

10. The roller member for a roller bearing as claimed in claim 4, wherein the length and diameter of said roller member are substantially equal.

11. A roller bearing comprising an annular inner shell defining an inner raceway on an external surface thereof;
an annular outer shell defining an outer raceway on an external surface thereof, said outer shell having parallel depending flanges extending radially inward toward but terminating short of said inner raceway;
said inner and outer raceways defining the load bearing surfaces of the raceway track of the roller bearing with said flanges comprising the lateral sides thereof; and
a plurality of load bearing cylindrical rollers dispensed in said raceway track with axes parallel to each other and normal to the longtudinal axis of said raceway track,
each of said rollers having a discoid end cap of low friction material at the axial ends thereof to slidably engage said flanges, each of said end caps having a diameter less than the diameter of said rollers and an axial thickness small relative to the axial length of said rollers.

12. The roller bearing as claimed in claim 11, wherein said end caps are a foil.

13. The roller bearing as claimed in claim 11, wherein said roller bearing is made of low friction organic resinous material.

14. The roller bearing as claimed in claim 11, wherein said roller bearing is made of inorganic material from the group consisting of a superhard alloy and a ceramic.

* * * * *